US011617221B2

(12) United States Patent
Otaka et al.

(10) Patent No.: US 11,617,221 B2
(45) Date of Patent: Mar. 28, 2023

(54) COMMUNICATION DEVICE, BASE STATION, AND COMMUNICATION SYSTEM

(71) Applicant: HONDA MOTOR CO., LTD., Tokyo (JP)

(72) Inventors: Masaru Otaka, Wako (JP); Ryusuke Tamanaha, Wako (JP); Yusuke Oi, Tokyo (JP); Takahiro Iijima, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 17/141,246

(22) Filed: Jan. 5, 2021

(65) Prior Publication Data

US 2021/0219379 A1    Jul. 15, 2021

(30) Foreign Application Priority Data

Jan. 10, 2020    (JP) .............................. JP2020-003012

(51) Int. Cl.
*H04W 76/30*    (2018.01)
*H04W 88/08*    (2009.01)

(52) U.S. Cl.
CPC ............ *H04W 76/30* (2018.02); *H04W 88/08* (2013.01)

(58) Field of Classification Search
CPC ..... H04W 76/30; H04W 88/08; H04W 88/10; H04W 76/34; H04W 4/48; H04W 36/0085; H04W 36/08; H04W 36/30; H04W 48/04; H04W 48/16; H04W 48/20
See application file for complete search history.

(56) References Cited

U.S. PATENT DOCUMENTS

| 2020/0245234 | A1   | 7/2020 | Omiya et al. |
| 2022/0095191 | A1 * | 3/2022 | Jung ................. H04W 36/0069 |
| 2022/0159524 | A1 * | 5/2022 | Jung .................... H04W 36/30 |

FOREIGN PATENT DOCUMENTS

| JP | 2016-063337 | 4/2016 |
| JP | 2018-074329 | 5/2018 |
| WO | 2017/204232 | 11/2017 |

* cited by examiner

*Primary Examiner* — Will W Lin
(74) *Attorney, Agent, or Firm* — Amin, Turocy & Watson, LLP

(57) ABSTRACT

According to an aspect, a communication device includes a communicator configured to perform communication with a base station and a plurality of access points having narrower communication ranges than the base station, a first acquirer configured to acquire vehicle information from in-vehicle equipment, a second acquirer configured to acquire information about communication quality for each of the plurality of access points, and a connection adjuster configured to release a connected state associated with a determined access point when the access point whose connected state is released is determined on the basis of the information about the communication quality acquired by the second acquirer if communication with the plurality of access points by the communicator is in the connected state.

7 Claims, 8 Drawing Sheets

52

| COMMUNICATION MODE | WIRELESS COMMUNICATION SCHEME | CONNECTED VEHICLE INFORMATION |
|---|---|---|
| BASE STATION (P CELL) | 4G | V003、V007、V012、… |
| ACCESS POINT AP1 (S CELL) | 4G | V002、V003 |
| ACCESS POINT AP2 (S CELL) | 5G | V001 |
| ACCESS POINT AP3 (S CELL) | 4G | V001 |
| … | … | … |

FIG. 6

262                                                                                              EACH TRAVELING STATUS

| DELAY TIME PERIOD [ms] | PRIORITY 1 AUTOMATED DRIVING-RELATED DATA | PRIORITY 2 DRIVE CONTROL DATA | PRIORITY 3 SURROUNDING INFORMATION | PRIORITY 4 NON-DRIVING INFORMATION |
|---|---|---|---|---|
| 0 ~ 5 | 1 | 1 | 1 | 0 |
| 5 ~ 20 | 0 | 1 | 1 | 0 |
| 20 ~ 100 | 0 | 0 | 1 | 0 |
| 100 ~ | 0 | 0 | 0 | 1 |

COMMUNICATION DEVICE, BASE STATION, AND COMMUNICATION SYSTEM

CROSS-REFERENCE TO RELATED APPLICATION

Priority is claimed on Japanese Patent Application No. 2020-003012, filed Jan. 10, 2020, the content of which is incorporated herein by reference.

BACKGROUND

Field of the Invention

The present invention relates to a communication device, a base station, and a communication system.

Description of Related Art

Conventionally, technology for connecting to a plurality of access points on the basis of position information or predetermined setting information of a vehicle or switching an access point of a connection destination so that stable communication is performed between the vehicle and an external device via a network is known (for example, International Publication No. WO2017/204232, Japanese Unexamined Patent Application, First Publication No. 2016-63337, and Japanese Unexamined Patent Application, First Publication No. 2018-74329).

SUMMARY

However, it may not be possible to perform efficient data transmission and reception according to a connected state associated with a plurality of access points.

Aspects of the present invention have been made in consideration of such circumstances and an objective of the present invention is to provide a communication device, a base station, and a communication system capable of implementing more efficient data transmission and reception.

A communication device, a base station, and a communication system according to the present invention adopt the following configurations.

(1): According to an aspect of the present invention, there is provided a communication device including: a communicator configured to perform communication with a base station and a plurality of access points having narrower communication ranges than the base station; a first acquirer configured to acquire vehicle information from in-vehicle equipment; a second acquirer configured to acquire information about communication quality for each of the plurality of access points; and a connection adjuster configured to release a connected state associated with a determined access point when the access point whose connected state is released is determined on the basis of the information about the communication quality acquired by the second acquirer if communication with the plurality of access points by the communicator is in the connected state.

(2): In the above-described aspect (1), each of the plurality of access points is connected to the base station and the connection adjuster generates a connection release request for releasing the connected state associated with the access point when the access point whose connected state is released is determined and causes the generated connection release request to be transmitted from the communicator to the base station.

(3): In the above-described aspect (1), the communication device further includes a third acquirer configured to acquire a communication requirement for each piece of the vehicle information, wherein the connection adjuster determines the access point whose connected state is released on the basis of the communication requirement acquired by the third acquirer.

(4): In the above-described aspect (1), the connection adjuster determines the access point whose connected state is released among a plurality of access points in the connected state on the basis of delay information of communication with the access point included in the communication quality.

(5): In the above-described aspect (1), the connection adjuster determines an access point for performing communication in a predetermined communication scheme as the access point whose connected state is released when the plurality of access points perform communication with the communicator in different communication schemes.

(6): According to another aspect of the present invention, there is provided a base station including: a first communicator configured to perform wireless communication with a vehicle located within a first communication range; a second communicator configured to perform communication with a plurality of access points that perform wireless communication with the vehicle in a second communication range narrower than the first communication range; and an information processor configured to perform a predetermined process on the basis of information received by the first communicator and the second communicator, wherein, when a connection release request for releasing a connected state associated with at least one access point among a plurality of access points connected to the vehicle has been received by the first communicator, the information processor causes the connected state between the access point associated with the connection release request and the vehicle to be released via the second communicator.

(7): According to another aspect of the present invention, there is provided a communication system including a base station and a communication device mounted in a vehicle, wherein the communication device includes a communicator configured to perform communication with a base station and a plurality of access points having narrower communication ranges than the base station; a first acquirer configured to acquire vehicle information from in-vehicle equipment; a second acquirer configured to acquire information about communication quality for each of the plurality of access points; and a connection adjuster configured to release a connected state associated with a determined access point when the access point whose connected state is released is determined on the basis of the information about the communication quality acquired by the second acquirer if communication with the plurality of access points by the communicator is in the connected state, wherein the base station includes a first communicator configured to perform wireless communication with the vehicle located within a first communication range; a second communicator configured to perform communication with a plurality of access points that perform wireless communication with the vehicle in a second communication range narrower than the first communication range; and an information processor configured to perform a predetermined process on the basis of information received by the first communicator and the second communicator, and wherein, when a connection release request for releasing a connected state associated with at least one access point among a plurality of access points connected to the vehicle has been received by the first communicator, the information processor causes the connected state between the access point associated with the connection release request and the vehicle to be released via the second communicator.

According to the above-described aspects (1) to (7), it is possible to implement more efficient data transmission and reception.

BRIEF DESCRIPTION OF THE DRAWINGS

FIG. 6 is a diagram showing an example of content of communication requirements.

DESCRIPTION OF EMBODIMENT

Hereinafter, embodiments of a communication device, a base station, and a communication system of the present invention will be described with reference to the drawings. The communication system including a vehicle equipped with the communication device will be described below. The vehicle is, for example, a vehicle such as a two-wheeled vehicle, a three-wheeled vehicle, or a four-wheeled vehicle. A drive source of the vehicle is an internal combustion engine such as a diesel engine or a gasoline engine, an electric motor, or a combination thereof. The electric motor is operated using electric power generated by an electric power generator connected to the internal combustion engine or electric power with which a secondary cell or a fuel cell is discharged.

First Embodiment

Figure 1:
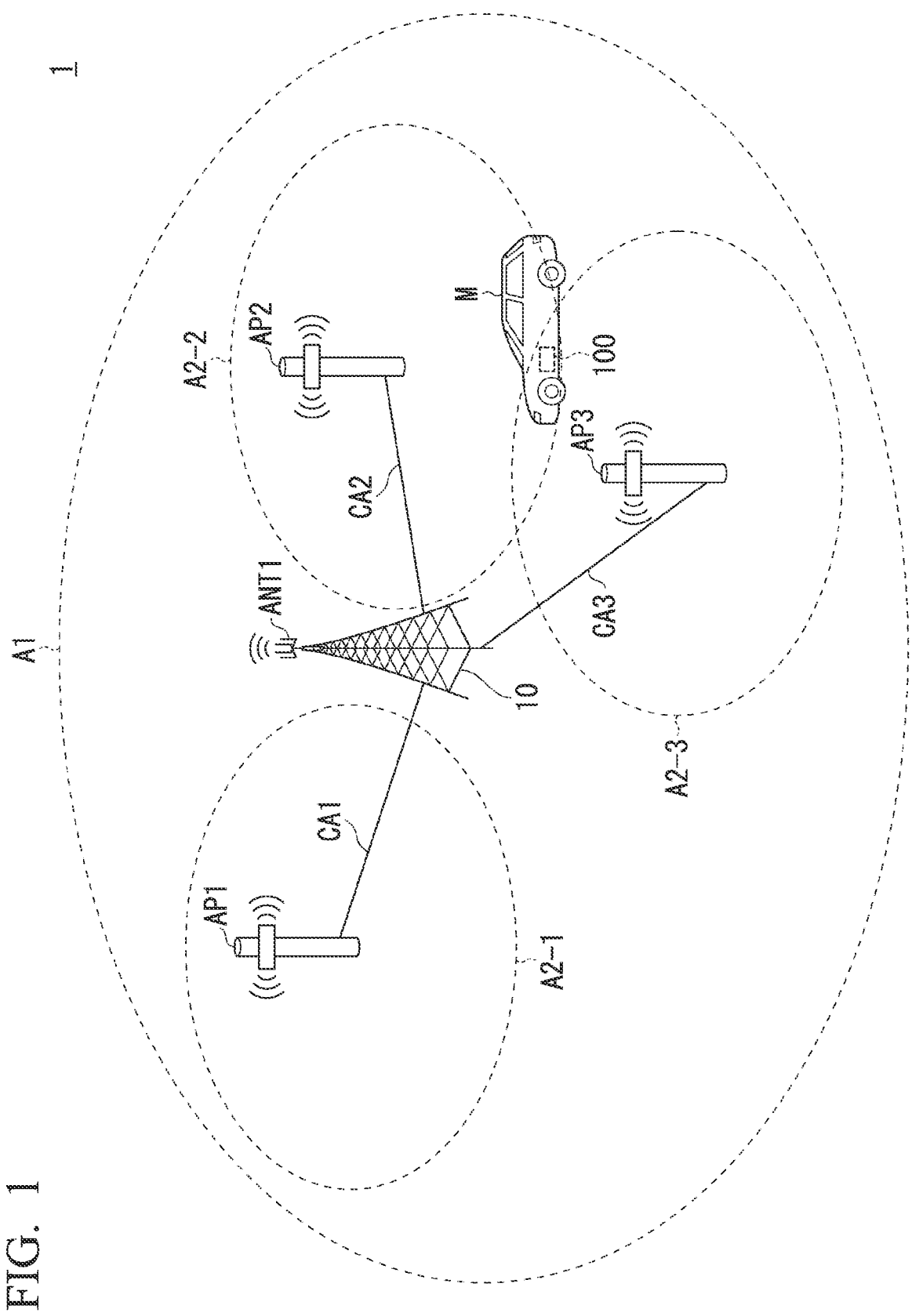
FIG. 1 is a diagram showing an example of a communication system including a vehicle equipped with a communication device according to a first embodiment.

FIG. 1 is a diagram showing an example of the communication system including the vehicle equipped with the communication device according to the first embodiment. A communication system 1 includes, for example, a base station 10, a plurality of access points AP, and a vehicle M. The communication system 1 may include a plurality of base stations or may include a plurality of vehicles. Although three access points are shown as the plurality of access points in the example of FIG. 1, the number of access points is not limited thereto. Hereinafter, when access points AP1 to AP3 are not distinguished, they will be simply referred to as an "access point AP." The same applies to a "communication range A2" and a "cable CA" to be described below.

The base station 10 performs communication with a communication device 100 mounted in the vehicle M located in a predetermined communication range A1 through wireless communication. Hereinafter, the communication with the communication device 100 mounted in the vehicle M is referred to as "communication with the vehicle M." The communication device 100 mounted in the vehicle M may be a portable phone or a smartphone of a person who uses the vehicle M as long as it performs a similar function. For example, the base station 10 transmits a beacon signal or the like within a communication range A1 at predetermined intervals and receives a signal from the vehicle M that has received the beacon signal to acquire position information of the vehicle M or assigns a radio channel or the like for use in communication to perform communication with the vehicle M using the assigned channel. The base station 10 may receive a beacon signal from the vehicle M to acquire a position of the vehicle M or may receive a connection request signal to assign a radio channel and perform communication with the vehicle M using the assigned channel.

The predetermined communication range A1 is set according to a communication standard or the like, and is, for example, a range within about several tens of meters [m] to several kilometers [m] centered on a transmission/reception antenna ANT1 of the base station 10. The communication range A1 is an example of a "first communication range." The communication range A1 is an example of a primary cell (P cell). In the P cell, a C-plane signal and a U-plane signal are mainly transmitted and received. The C-plane signal includes, for example, various types of control signals related to mobile communication (for example, a signal for controlling telephone communication or a network between devices). For example, the C-plane signal is used when call control is performed, when a transmission path is set for transmitting data, when control such as a handover is performed, and the like. The C-plane signal is used, for example, when the assignment of a radio channel in wireless communication control between the communication device 100 and the base station 10 using a radio resource control (RRC) message or the like is performed. The U-plane signal is a signal for transmitting and receiving user data (for example, vehicle information or content data such as voice data, image data, and moving image data to be described below). Because the P cell has a wider communication range than an S cell, it is possible to restrict the switching of a cell during the telephone communication by transmitting and receiving voice data using the C-plane signal within the P cell.

The base station 10 is connected to a plurality of access points AP located within the communication range A1 through cables CA and manages a connected state between each access point AP and the vehicle M. In the example of FIG. 1, it is assumed that the three access points AP1 to AP3 are present and connected to the base station 10 through cables CA1 to CA3. The cables CA1 to CA3 are, for example, optical fiber cables through which communication having a higher speed than wireless communication can be performed and the like. The base station 10 and the access points AP1 to AP3 may be connected through wireless communication in at least a partial section.

Each of the access points AP1 to AP3 performs communication with the vehicle M in communication ranges A2-1 to A2-3 narrower than the communication range A1 of the base station 10. Each of the access points AP1 to AP3 transmits a beacon signal or the like within the communication range A1 at predetermined intervals and receives a signal from the vehicle M that has received the beacon signal, so that each of the access points AP1 to AP3 assigns a radio channel or the like and performs communication with the vehicle M using the assigned channel. A connected state between the vehicle M and the access point AP is managed by the base station 10.

Each of the communication ranges A2-1 to A2-3 is an example of a "second communication range." Each of the communication ranges A2-1 to A2-3 is an example of an S cell (a small cell). In the S cell, a U-plane signal is mainly transmitted and received, and, for example, user data (for example, vehicle information and content data such as image data and moving image data to be described below) other than voice data is transmitted and received in the U-plane signal to be transmitted and received within the S cell. A plurality of S cells may be installed within the P cell and communication ranges of the plurality of S cells may overlap each other. The vehicle M can be connected to the plurality of S cells.

Here, the communication range A2 of a certain S cell may overlap the communication range A2 of another S cell. When the communication ranges A2 overlap each other, each access point AP restricts the interference of radio waves transmitted from each S cell by making frequency bands of the S cells belonging to the ranges different.

Each of the base station 10 and the access points AP1 to AP3 performs communication with the vehicle M using any one of a plurality of predetermined wireless communication schemes. The wireless communication schemes include, for example, a communication scheme based on a communication standard of a fourth-generation communication system (for example, IMT-Advanced) (hereinafter referred to as "4G"), a communication scheme based on a communication standard of a fifth-generation communication system (hereinafter referred to as "5G"), and the like. The wireless communication schemes may include a communication scheme based on a communication standard of a third-generation communication system (for example, IMT-2000) (hereinafter referred to as "3G"), communication schemes based on communication standards of other next-generation communication systems, and the like. 4G may include Long Term Evolution (LTE) (registered trademark) technology. In the wireless communication schemes, faster communication is enabled in newer generations.

The communication device 100 mounted in the vehicle M performs control for connecting to the base station 10 when the communication device 100 is within the communication range A1 of the base station 10 and connecting to the access point AP when the communication device 100 is within the communication range A2 of the access point AP. When the communication device 100 is located within the communication range A2 of the plurality of access points AP, the communication device 100 may be connected to each access point. For example, when communication of 4G or 5G is performed, it is possible to expand a bandwidth and improve throughput in communication by performing carrier aggregation (CA) control using radio waves (carriers) of different frequency bands. For example, the communication device 100 transmits vehicle information acquired from equipment mounted in the vehicle M (in-vehicle equipment) or the like to an external device (for example, a server device) via the base station 10 or the access point AP with which communication is connected or receives information transmitted from the server device or the like.

Next, configurations of the base station 10, the access point AP, and the vehicle M equipped with the communication device 100 will be specifically described.

[Base Station]

Figures 2, 3:
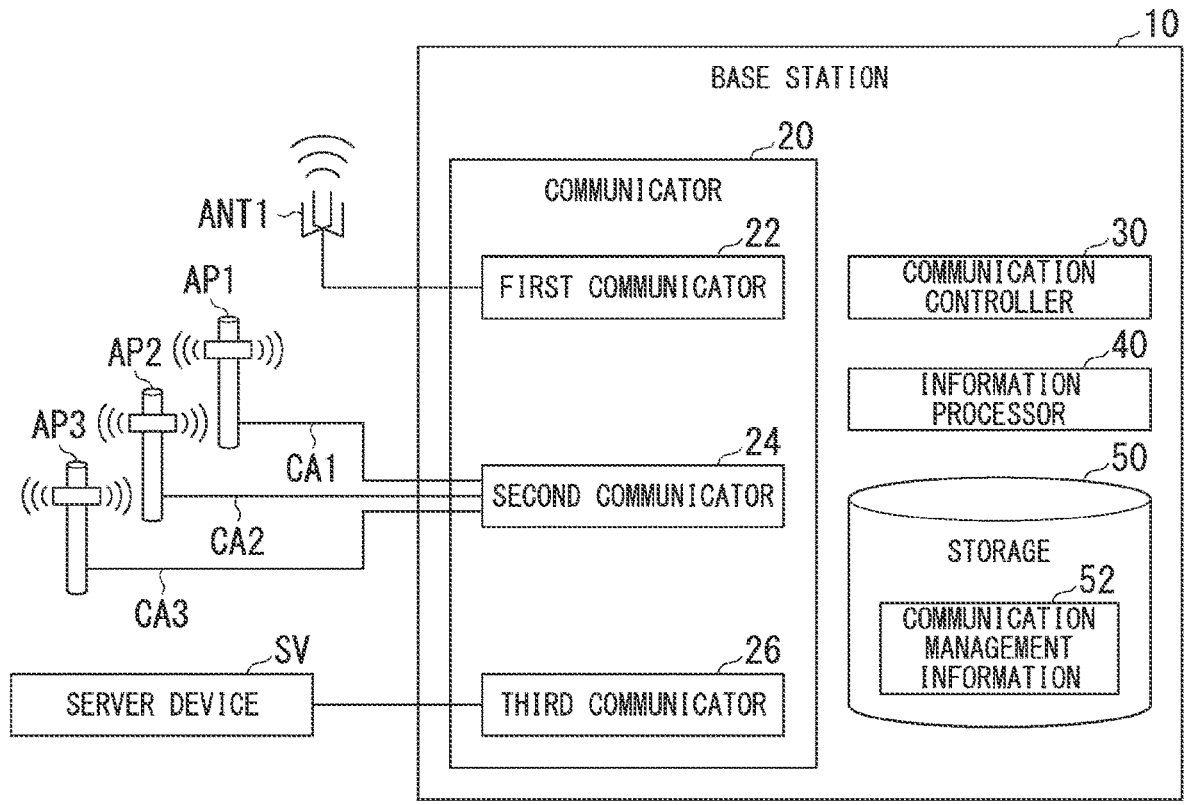
FIG. 2 is a configuration diagram of a base station according to the first embodiment.
FIG. 3 is a diagram showing an example of content of communication management information.

FIG. 2 is a configuration diagram of the base station 10 of the first embodiment. The base station 10 includes, for example, a communicator 20, a communication controller 30, an information processor 40, and a storage 50. The communication controller 30 and the information processor 40 are implemented by, for example, a hardware processor such as a central processing unit (CPU) executing a program (software). Some or all of these components may be implemented by hardware (including a circuit; circuitry) such as a large scale integration (LSI) circuit, an application specific integrated circuit (ASIC), a field-programmable gate array (FPGA), or a graphics processing unit (GPU) or may be implemented by software and hardware in cooperation. The program may be pre-stored in the storage 50 or may be stored in a removable storage medium such as a DVD or a CD-ROM and installed in the storage 50 when the storage medium is mounted in a drive device.

For example, the storage 50 is implemented by a hard disk drive (HDD), a flash memory, an electrically erasable programmable read only memory (EEPROM), a read only memory (ROM), a random access memory (RAM), or the like. The storage 50 stores, for example, communication management information 52, information about a communication scheme at the time of communication with the outside, a program to be read and executed by a processor, various other types of information, and the like.

FIG. 3 is a diagram showing an example of content of the communication management information 52. The communication management information 52 is, for example, information in which a wireless communication scheme and connected vehicle information are associated with a communication mode. The communication mode includes, for example, communication in the P cell by the base station 10, communication in the S cell by the access point AP connected to the base station 10, and the like. The wireless communication scheme is a communication scheme set for each communication mode. As shown in the example of FIG. 3, the wireless communication schemes of the base station 10 and the access points AP1 and AP3 are "4G" and the wireless communication scheme of the access point AP2 is "5G." The wireless communication scheme may be set by, for example, a server device SV and information may be acquired from the access points AP1 to AP3. For example, the connected vehicle information is identification information for identifying a communication mode of the base station 10, the access point AP, or the like and the vehicle M in which the communication device 100 in a connected state is mounted. In the communication management information 52, instead of (or in addition to) the connected vehicle information, identification information (connected communication terminal information) for identifying the communication device 100 in the connected state may be associated with the communication mode.

The communicator 20 includes, for example, a first communicator 22, a second communicator 24, and a third communicator 26. The first communicator 22 performs wireless communication with the vehicle M located within the communication range A1 via the antenna ANT1 of the base station 10. The second communicator 24 performs communication with a plurality of access points AP1 to AP3 capable of communicating with the vehicle M within the communication range A1 and the communication ranges A2-1 to A2-3 narrower than the communication range A1. The second communicator 24 is connected to the access points AP1 to AP3 through, for example, the cables CA1 to CA3 such as optical cables. The third communicator 26 performs communication with the server device SV. Here, the third communicator 26 may perform communication with the server device SV via a communication network or the like. In this case, the communication network may be a wired network, a wireless network, or a combination thereof. Further, the server device SV may be a so-called edge server located near the base station 10 and connected in a wired manner. The third communicator 26 may perform communication with a communication terminal (not shown) of a communication partner who performs telephone communication with an occupant according to a telephone communication function of a hands-free telephone communication device 250 mounted in the vehicle M.

The communication controller 30 controls the communication in the first communicator 22, the second communicator 24, and the third communicator 26. For example, the communication controller 30 performs radio resource control such as assignment of radio channels, sets a transmission path for transmitting data, or performs various types of communication control such as a communication connection and the release of a connected state, on the basis of the C-plane signal received from the first communicator 22. The communication controller 30 causes data (for example, a U-plane signal including vehicle information and the like) received by the first communicator 22 or the second communicator 24 to be transmitted from the third communicator 26 to the server device SV. When information transmitted from the server device SV has been received by the third communicator 26, the communication controller 30 causes the received information to be transmitted from the second communicator 24 to one or more access points among the plurality of access points AP1 to AP3. When the data received from the first communicator 22 is data based on the telephone communication function of the hands-free telephone communication device 250 (for example, voice data), the communication controller 30 performs communication control for implementing telephone communication with a communication terminal of a telephone communication destination via the third communicator 26.

The information processor 40 performs a predetermined process on the basis of information transmitted and received by the communicator 20. For example, the information processor 40 acquires information about a communication mode (particularly, a wireless communication mode), a communication scheme, and the like capable of being executed in the communicator 20 from the antenna ANT1, the access points AP1 to AP3, the server device SV, and the like via the communicator 20 and registers communication management information 52 in the storage 50, or updates the communication management information 52 stored in the storage 50, on the basis of the acquired information. The information processor 40 registers the communication management information 52 in the storage 50, or updates the registered communication management information 52, on the basis of information about the vehicle equipped with the communication device 100 connected to the first communicator 22 and the second communicator 24. The information processor 40 performs a process of causing vehicle information or the like received from the plurality of access points AP1 to AP3 by the first communicator 22 to be transmitted from the third communicator 26 to the server device SV or selecting an access point among the access points AP1 to AP3 in accordance with a type of data acquired from the server device SV. For example, the server device SV has a function of analyzing a captured image when the information received from the vehicle M is an image captured by an in-vehicle camera and extracting particulars (a pedestrian, dangerous traffic, weather, pedestrian traffic, and advertisement information) and the like. This function may be provided in the base station 10.

[Access Point]

Figure 4:
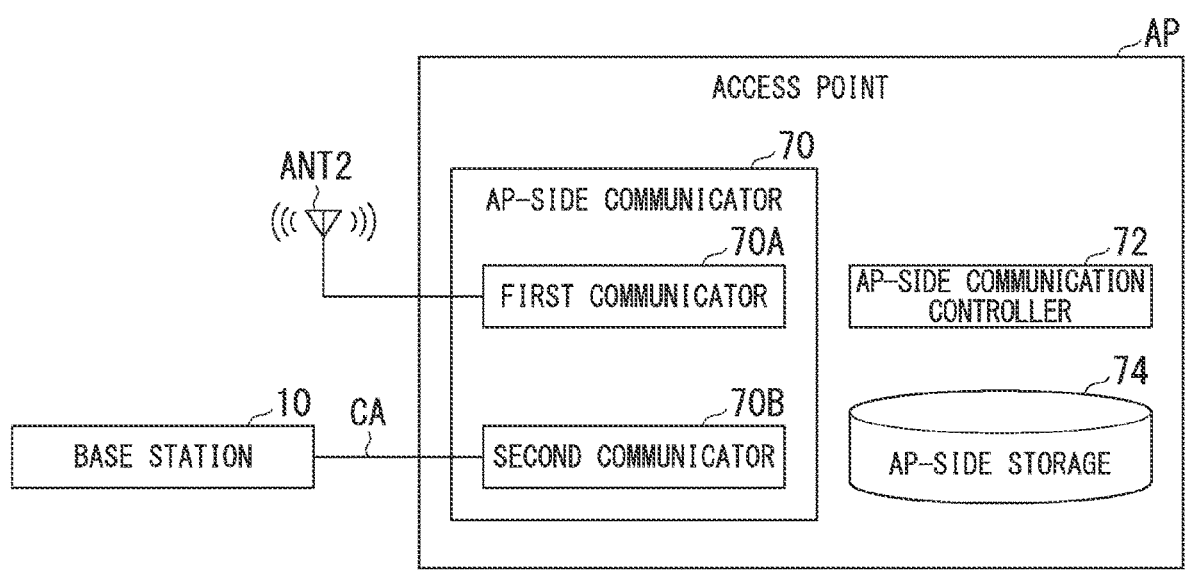
FIG. 4 is a configuration diagram of an access point according to the first embodiment.

Next, the configuration of the access point AP will be described. FIG. 4 is a configuration diagram of the access point AP according to the first embodiment. The access point AP includes, for example, an AP-side communicator 70, an AP-side communication controller 72, and an AP-side storage 74. The AP-side communication controller 72 is implemented by, for example, a hardware processor such as a CPU executing a program (software). Some or all of these components may be implemented by hardware (including a circuit; circuitry) such as an LSI circuit, an ASIC, an FPGA, or a GPU or may be implemented by software and hardware in cooperation. The program may be pre-stored in the AP-side storage 74 or may be stored in a removable storage medium such as a DVD or a CD-ROM and installed in the AP-side storage 74 when the storage medium is mounted in a drive device.

The AP-side storage 74 is implemented by, for example, an HDD, a flash memory, an EEPROM, a ROM, a RAM, or the like. The AP-side storage 74 stores, for example, information about a communication scheme at the time of communication with the outside, a program to be read and executed by the processor, various other types of information, and the like.

The AP-side communicator 70 includes, for example, a first communicator 70A and a second communicator 70B. For example, the first communicator 70A performs communication with the vehicle M located within the communication range A2 via a transmission/reception antenna ANT2. The second communicator 70B performs communication with the base station 10 via the cable CA.

The AP-side communication controller 72 controls communication in the first communicator 70A and the second communicator 70B. For example, the AP-side communication controller 72 performs control for performing communication with the vehicle M via the first communicator 70A in a predetermined communication scheme or a communication scheme set by the base station 10. The AP-side communication controller 72 acquires the identification information and the vehicle information of the vehicle M connected to the first communicator 70A and transmits various types of information that have been acquired from the second communicator 70B to the base station 10.

The AP-side communication controller 72 may generate a response signal in response to a request signal from the vehicle M received by the first communicator 70A and cause the response signal to be transmitted from the first communicator 70A to the vehicle M or may generate information about communication quality associated with the vehicle M and cause the generated information to be transmitted from the first communicator 70A to the vehicle M. The communication quality includes, for example, information about communication strength associated with the vehicle M (for example, reception strength of radio waves transmitted from the vehicle M) and the like. The AP-side communication controller 72 may perform control for setting the communication with the vehicle M to the connected state or releasing the connected state on the basis of the control information of the base station 10.

[In-Vehicle Device]

Figure 5:
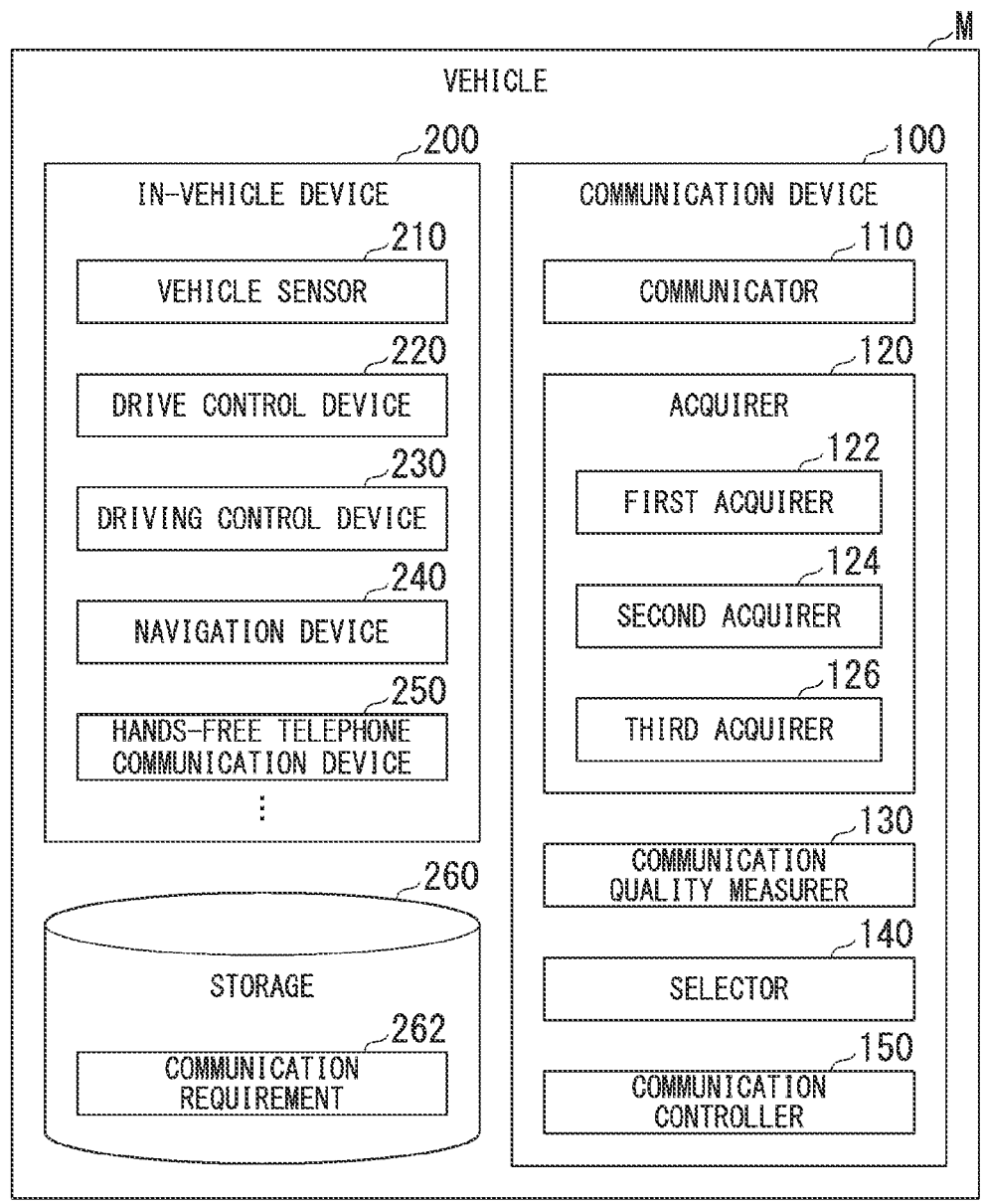
FIG. 5 is a configuration diagram of a vehicle including a communication device according to the first embodiment.

Next, the configuration of the vehicle M including the communication device 100 will be described. FIG. 5 is a configuration diagram of the vehicle M including the communication device 100 according to the first embodiment. In the example of FIG. 5, components of the vehicle M used in the process executed by the communication system 1 according to the first embodiment will be mainly described.

The vehicle M includes, for example, a communication device 100, an in-vehicle device 200, and a storage 260.

A configuration of the in-vehicle device 200 will be described before the description of the communication device 100. The in-vehicle device 200 includes, for example, a vehicle sensor 210, a drive control device 220, a driving control device 230, a navigation device 240, and a hands-free telephone communication device 250. The vehicle sensor 210 includes, for example, an accelerator opening sensor, a vehicle speed sensor, a brake depression amount sensor, and the like. The accelerator opening sensor is attached to an accelerator pedal (an example of an operation element) for receiving an acceleration instruction from a driver of the vehicle M, detects an amount of operation of the accelerator pedal, and outputs the detected amount of operation as an accelerator opening to the drive control device 220. The vehicle speed sensor includes, for example, a wheel speed sensor and a speed calculator attached to each wheel and combines wheel speeds detected by wheel speed sensors to derive the speed of the vehicle M (a vehicle speed) and output the derived speed to the drive control device 220. The brake depression amount sensor is attached to a brake pedal (an example of the operation element) for receiving a deceleration or stop instruction from the driver, detects an amount of operation of the brake pedal by the driver, and outputs the detected amount of operation as an amount of brake depression to the drive control device 220.

The vehicle sensor 210 may include sensors configured to detect information about a traveling status of the vehicle M. The sensors configured to detect the information about the traveling status of the vehicle M include a position sensor configured to detect a position of the vehicle M and the like, a vehicle speed sensor configured to detect the speed of the vehicle M, an acceleration sensor configured to detect acceleration, a yaw speed sensor configured to detect an angular speed around a vertical axis, a direction sensor configured to detect a direction of the vehicle M, and the like. For example, the position sensor detects the position of the vehicle M through a Global Positioning System (GPS) device (not shown). The position sensor may detect the position of the vehicle M through a global navigation satellite system (GNSS) receiver included in the navigation device 240 to be described below.

The vehicle sensor 210 may include, for example, a camera, a radar device, a light detection and ranging (LIDAR) sensor, a physical object recognition device, and the like. These are, for example, components for detecting information about surroundings of the vehicle M. For example, the camera is a digital camera using a solid-state imaging element such as a charge coupled device (CCD) or a complementary metal oxide semiconductor (CMOS). The camera may be a stereo camera. The camera is attached to any location on the vehicle M. When the view in front of the vehicle M is imaged, the camera is attached to an upper part of a front windshield, a rear surface of a rearview mirror, or the like. For example, the camera periodically and iteratively images the surroundings of the vehicle M. For example, pedestrians who are likely to appear suddenly and the like are extracted by analyzing the captured image and a notification of analysis and extraction results is provided to a nearby vehicle and used for real-time-sensitive information.

The radar device radiates radio waves such as millimeter waves around the vehicle M and detects at least a position (a distance to and a direction) of a physical object located nearby by detecting radio waves (reflected waves) reflected by the physical object. The radar device is attached to any location on the vehicle M. The radar device may detect a position and a speed of the physical object in a frequency modulated continuous wave (FM-CW) scheme.

The LIDAR sensor radiates light (or electromagnetic waves having a wavelength close to light) to the vicinity of the vehicle M and measures scattered light. The LIDAR sensor detects a distance to an object on the basis of a time period from light emission to light reception. The radiated light is, for example, pulsed laser light. The LIDAR sensor is attached to any location on the vehicle M.

The physical object recognition device performs a sensor fusion process on detection results from some or all of the camera, the radar device, and the LIDAR sensor to recognize a position, a type, a speed, and the like of a physical object near the vehicle M. The physical object recognition device outputs recognition results to the driving control device 230. The physical object recognition device may output detection results of the camera, the radar device, and the LIDAR sensor to the driving control device 230 as they are. In this case, the physical object recognition device 16 may be omitted from the vehicle M.

The drive control device 220 is a device for giving a driving force or the like to the vehicle M to drive the vehicle M. The drive control device 220 includes, for example, a travel driving force output device configured to output a travel driving force (torque) for enabling the vehicle M to travel to the drive wheels, a brake device configured to output a brake torque according to a predetermined braking operation to each wheel, and a steering device configured to change a direction of the steering wheel.

For example, the travel driving force output device may include a combination of an internal combustion engine, an electric motor, a transmission, and the like, and an electronic control unit (ECU) that controls the internal combustion engine, the electric motor, the transmission, and the like. The travel driving force output device controls the above-described components in accordance with information input from the driving control device 230 or information input from the driving operation element (for example, the accelerator pedal). For example, the brake device includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the driving control device 230 or the information input from the driving operation element (for example, the brake pedal) so that brake torque according to a braking operation is output to each wheel. The brake device may include a mechanism configured to transfer the hydraulic pressure generated by an operation of the brake pedal included in the driving operation element to the cylinder via a master cylinder as a backup. The brake device is not limited to the above-described configuration and may be an electronically controlled hydraulic brake device configured to control an actuator in accordance with information input from the driving control device 230 and transfer the hydraulic pressure of the master cylinder to the cylinder. For example, the steering device includes a steering ECU and an electric motor. For example, the electric motor changes a direction of steerable wheels by applying a force to a rack and pinion mechanism. The steering ECU drives the electric motor in accordance with the information input from the driving control device 230 or the information input from the steering wheel of the driving operation element (for example, a steering wheel) to change the direction of the steerable wheels.

The driving control device 230 performs, for example, automated driving (autonomous driving) control, driving assistance control, and the like of the vehicle M. The automated driving control is, for example, control of one or both of the steering or the speed of the vehicle M without depending on a driving operation by an occupant of the vehicle M. The driving assistance control is, for example, driving control that assists the occupant in performing the driving operation such as an adaptive cruise control system (ACC), a lane keeping assistance system (LKAS), or a collision mitigation brake system (CMBS). For example, the driving control device 230 generates driving control content corresponding to a surrounding situation of the vehicle M detected by the vehicle sensor 210, behavior of the vehicle M, a control instruction from the occupant, or control information acquired from the server device SV via the base station 10 or the access point AP by the communication device 100, outputs the generated driving control content to the drive control device 220, and causes each device to be driven.

The navigation device 240 includes, for example, the GNSS receiver, a navigation human machine interface (HMI), and a route determiner. The navigation device 240 retains map information in a storage device such as an HDD or a flash memory. The GNSS receiver identifies a position of the vehicle M on the basis of a signal received from the GNSS satellite. The position of the vehicle M may be identified or corrected by an inertial navigation system (INS) using an output of the vehicle sensor 210 mounted in the vehicle M.

The navigation HMI includes a display, a speaker, a touch panel, keys, and the like. The navigation HMI allows an occupant (a user) to set a destination or the like using images, sounds, or the like, or provides the occupant to be guided with a traveling route to the destination. For example, the route determiner determines a route (hereinafter referred to as a route on a map) from the position of the vehicle M identified by the GNSS receiver (or any input position) to a destination input by the occupant using the navigation HMI with reference to the map information. The map information is, for example, information in which a road shape is expressed by a link indicating a road and nodes connected by a link. The map information may include a curvature of a road, point of interest (POI) information, and the like. For example, the map information includes information about a center of a lane, information about a boundary of a lane, information about a type of lane, and the like. The map information may include road information, traffic regulation information, address information (an address/postal code), facility information, telephone number information, and the like. The map information may be updated at any time by the communication device 100 communicating with another device. On the basis of the route on the map, the navigation device 240 provides route guidance and the like through a map image display process of a display and a sound output process of a speaker (not shown).

The navigation device 240 may be configured to acquire information about a traveling status of the vehicle M on the basis of the identified position of the vehicle M and the map information and output the acquired information to the communication device 100. In this case, the navigation device 240 acquires road information (for example, an expressway, the vicinity of an intersection, and a sharp curve) and the like while the vehicle M is traveling as information about the traveling status of the vehicle M.

For example, the hands-free telephone communication device 250 performs control related to telephone communication between the occupant of the vehicle M and a telephone communication destination outside the vehicle and the like. For example, the hands-free telephone communication device 250 analyzes a voice of the occupant input to a microphone provided in the interior of the vehicle and issues a call transmission request for a communication partner via the network when a telephone number or a call transmission command within the voice has been received. The telephone number or the call transmission command may be input through a touch panel of an in-vehicle display device or may be input through various types of switches provided on the steering wheel or the like. The hands-free telephone communication device 250 establishes a circuit connection when communication permission from the communication partner is received, receives a voice transmitted from the communication partner and outputs the received voice from the speaker or the like in the interior of the vehicle or transmits the voice input by the microphone to the communication partner. The hands-free telephone communication device 250 disconnects communication with the communication partner when a disconnection instruction has been received through a voice or a predetermined operation.

In addition to the above-described devices, for example, the in-vehicle device 200 may include at least one of an audio device, a battery management device, a keyless entry system, a suspension system, an airbag device, a door lock device, a door opening/closing device, a windshield opening/closing device, a seat position control device, a rearview mirror angle position control device, an illumination control device inside and outside the vehicle, a wiper or defogger control device, a direction indicator light control device, and an air conditioning device.

The communication device 100 includes, for example, a communicator 110, an acquirer 120, a communication quality measurer 130, a selector 140, and a communication controller 150. Each component of the communication device 100 is implemented by, for example, a hardware processor such as a CPU executing a program (software). Some or all of these components may be implemented by hardware (including a circuit; circuitry) such as an LSI circuit, an ASIC, an FPGA, or a GPU or may be implemented by software and hardware in cooperation. The program may be pre-stored in the storage 260 or may be stored in a removable storage medium such as a DVD or a CD-ROM and installed in the storage 260 when the storage medium is mounted in the drive device. Some or all of the components of the communication device 100 are examples of a telematics control unit (TCU).

The storage 260 is implemented by, for example, an HDD, a flash memory, an EEPROM, a ROM, a RAM, or the like. The storage 260 stores, for example, a communication requirement 262, a program to be read and executed by the processor, various other types of information, and the like. The content of the communication requirement 262 will be described below. The storage 260 may be provided within the communication device 100.

The communicator 110 performs wireless communication with the base station 10 and the access point AP using, for example, a cellular network, a Wi-Fi network, Bluetooth (registered trademark), dedicated short range communication (DSRC), or the like. For example, in the cellular network, communication based on a communication scheme such as 4G or 5G is possible. The Wi-Fi network is, for example, a radio wave communication network in which each individual or each company can freely use an own network. In the Wi-Fi network, communication based on a communication scheme such as 4G or 5G is possible. The communication standard of the communication scheme based on Wi-Fi has a significantly narrow radio wave reception range and is limited to use at about 10 to 100 [m] from a Wi-Fi antenna position.

The acquirer 120 includes, for example, a first acquirer 122, a second acquirer 124, and a third acquirer 126. The first acquirer 122 acquires information obtained from each component of the in-vehicle device 200 as vehicle information. The vehicle information includes, for example, information detected by the vehicle sensor 210, control data in the drive control device 220, control data in the driving control device 230, and navigation information from the navigation device 240 (for example, destination information or guidance information of a route to a destination), voice data from the hands-free telephone communication device 250, and the like. The first acquirer 122 may give a priority to each piece of acquired vehicle information. For example, the priority is set to be higher as smaller-delay communication is required when communication is performed between the server device SV and the vehicle M.

The second acquirer 124 acquires information about communication quality for each access point AP. The information about the communication quality includes, for example, information about communication latency. Latency is one of indices regarding data communication. For example, the latency includes delay information such as a communication delay time period. The information regarding the communication quality may include, for example, communication strength such as reception strength of radio waves transmitted from the access point AP. In the example of FIG. 1, the vehicle M is located within the communication ranges A2-2 and A2-3 of the access points AP2 and AP3. Therefore, the second acquirer 124 acquires information about communication quality for each of the access points AP2 and AP3. The second acquirer 124 may acquire the communication quality measured by the communication quality measurer 130 or may acquire information about the communication quality from the information transmitted from each access point AP.

The third acquirer 126 acquires a communication requirement 262 for the vehicle information acquired by the first acquirer 122. For example, the communication requirement 262 may be acquired from the storage 260 or may be acquired from an external device connected via the communicator 110.

The communication quality measurer 130 measures communication quality (for example, delay information or communication strength) of each of one or more access points AP with which communication can be performed by the communicator 110. Details of a function of the communication quality measurer 130 will be described below.

The selector 140 is an access point AP that transmits vehicle information acquired by the first acquirer 122 on the basis of information about the communication quality acquired by the second acquirer 124 and the communication requirement 262 acquired by the third acquirer 126. Details of a function of the selector 140 will be described below.

The communication controller 150 performs various types of control for transmitting vehicle information to the access point AP selected by the base station 10 or the selector 140. For example, the communication controller 150 generates a connection request for communicating with the access point AP selected by the selector 140 and transmits instruction information including the generated connection request to the base station 10. In this case, for example, the communication controller 150 includes the instruction information in an RRC message of a C-plane signal and transmits the RRC message to the base station 10. Thereby, the base station 10 executes control for causing the access point AP included in the connection request to communicate with the vehicle M and the communication between the vehicle M and the access point AP becomes connected. The communication controller 150 may perform control for directly communicating with and connecting to the access point AP selected by the selector 140. For example, the communication controller 150 adds vehicle information to a U-plane signal and transmits the U-plane signal to the access point AP or the base station 10 in the connected state. When driving control information from the server device SV has been received via the base station 10 or the access point AP, the communication controller 150 may output the received information to the driving control device 230 or the like. When voice data has been received from the communication terminal of the telephone communication destination via the base station 10 or the access point AP, the communication controller 150 may cause the voice data to be output to the hands-free telephone communication device 250 or may cause the voice data to be output from the speaker.

[Selection of Access Point Based on Communication Quality]

Next, content of selection of the access point mainly based on the communication quality will be specifically described as the functions of the communication quality measurer 130 and the selector 140. For example, the communication quality measurer 130 measures a delay time period of communication with a communicable access point AP as the communication quality. In the example of FIG. 1, the vehicle M is located within the communication ranges A2-2 and A2-3 of the access points AP2 and AP3. In this case, the communication quality measurer 130 measures the delay time period of communication with each of the access points AP2 and AP3. For example, the communication quality measurer 130 transmits a request signal for requesting a response to each of the access points AP2 and AP3 and measures a time period from the transmission to the reception of the response signal as a communication delay time period. For example, a shorter delay time period is associated with smaller (lower) latency and a longer delay time period is associated with larger (higher) latency.

The communication quality measurer 130 may measure reception strength when the data transmitted from the access points AP2 and AP3 has been received as the communication quality. The communication quality measurer 130 may acquire communication schemes of the access points AP2 and AP3 as communication qualities. For example, higher reception strength is associated with better communication quality and lower reception strength is associated with worse communication quality.

The second acquirer 124 acquires the communication quality for each access point AP measured by the communication quality measurer 130 as information about the communication quality. The second acquirer 124 may acquire information about the communication quality generated by the access point AP side.

The third acquirer 126 acquires the communication requirement 262. FIG. 6 is a diagram showing an example of content of the communication requirement 262. In the example of FIG. 6, the delay time period is shown as an example of information about communication quality. The communication requirement 262 is information in which a delay time period [ms] is associated with a flag indicating whether or not communication is to be permitted for each type of vehicle information. That is, in the example of FIG. 6, a degree of permission of the delay time period for which transmission is possible is shown for each type of vehicle information. In the example of FIG. 6, "1" is shown when transmission is permitted and "0" is shown when transmission is not permitted, but other flags may be used. The delay time period shown in FIG. 6 may be changed to another time period. Other communication quality such as reception strength may be used instead of the delay time period.

The communication requirement 262 may include information about the priority for each type of vehicle information. In the example of FIG. 6, it is assumed that priority 1 is the highest and the priority is lower in the order of priority 2, priority 3, and priority 4. Priority 1 includes, for example, vehicle information (automated-driving-related data) related to automated driving control by the driving control device 230.

Priority 2 includes, for example, vehicle information (drive control data) related to drive control by the drive control device 220. Priority 3 includes, for example, vehicle information (surrounding information) about the surrounding status of the vehicle M detected by the vehicle sensor 210. Priority 4 includes, for example, vehicle information (non-driving information) that is not directly related to the control or traveling of the vehicle M such as content data.

The communication requirement 262 may be a common communication requirement regardless of the traveling status of the vehicle M included in the vehicle information and may be provided for each traveling status as shown in FIG. 6. The communication requirement 262 is provided for each driving status, so that the third acquirer 126 can acquire different communication requirements, for example, when the vehicle M is traveling at an intersection and when the vehicle M is traveling on an expressway or can acquire a communication requirement according to a traveling speed. For example, the communication requirement when the vehicle M is traveling at an intersection has a higher surrounding information priority than the communication requirement when the vehicle M is traveling on an expressway and also has a smaller delay time period for which communication is permitted than the communication requirement when the vehicle M is traveling on an expressway. In this manner, it is possible to make a more appropriate determination of whether or not communication is to be allowed by differentiating the acquired communication requirement in accordance with the traveling status of the vehicle M.

The selector 140 selects an access point for transmitting vehicle information acquired by the first acquirer 122 on the basis of information about the communication quality acquired by the second acquirer 124 and the communication requirement 262 according to the traveling status acquired by the third acquirer 126. A case in which the communication requirement 262 in the foreground of FIG. 6 has been acquired by the third acquirer 126 will be described below.

For example, the selector 140 selects an access point having a communication delay time period greater than or equal to 0 [ms] and less than 5 [ms] as an access point for transmitting automated driving-related data, on the basis of the communication requirement 262. The selector 140 selects an access point having a communication delay time period greater than or equal to 0 [ms] and less than 20 [ms] as an access point for transmitting drive control data. The selector 140 selects an access point having a communication delay time period greater than or equal to 0 [ms] and less than 100 [ms] as an access point for transmitting information about surroundings of the vehicle M. The selector 140 selects an access point having a communication delay time period greater than or equal to 100 [ms] as an access point for transmitting content data or the like. The content data is, for example, content data (for example, voice data) that is not related to the control or traveling of the vehicle M.

When vehicle information of a plurality of priorities is transmitted at the same access point, the selector 140 may cause vehicle information having a higher priority to be preferentially transmitted or may select another access point for transmitting vehicle information having a lower priority. In this manner, because the vehicle information having the higher priority can be transmitted to the server device SV or the like with a smaller delay by selecting the access point for transmission for each type of vehicle information, it is possible to quickly acquire control information from the server device SV and execute more appropriate driving control.

The selector 140 may select an access point whose communication delay time period is within a predetermined time period as an access point for transmitting the vehicle information. For example, the selector 140 selects an access point having a delay time period less than 100 [ms] when vehicle information of priorities 1 to 3 is transmitted. Thereby, the throughput in communication can be improved when a plurality of access points transmit information (automated driving-related data, drive control data, and surrounding information) related to the control and traveling of the vehicle M.

The selector 140 may select the access point for transmission for each piece of vehicle information in accordance with the reception strength instead of the delay time period. In this manner, the selector 140 selects a type of vehicle information to be transmitted to the access point on the basis of information regarding latency of communication with the access point, so that information having high importance can be transmitted via the access point having low (small) latency.

The selector 140 may select a transmission destination of the vehicle information acquired from the in-vehicle equipment according to a type of in-vehicle equipment. For example, the selector 140 selects the base station 10 whose communication range is wide instead of the access point AP whose communication range is narrow as a communication destination with respect to vehicle information (for example, voice data or information about telephone communication control) acquired from the hands-free telephone communication device 250. Thereby, it is possible to perform stable communication in which cell switching is restricted.

[Processing Sequence]

Figure 7:
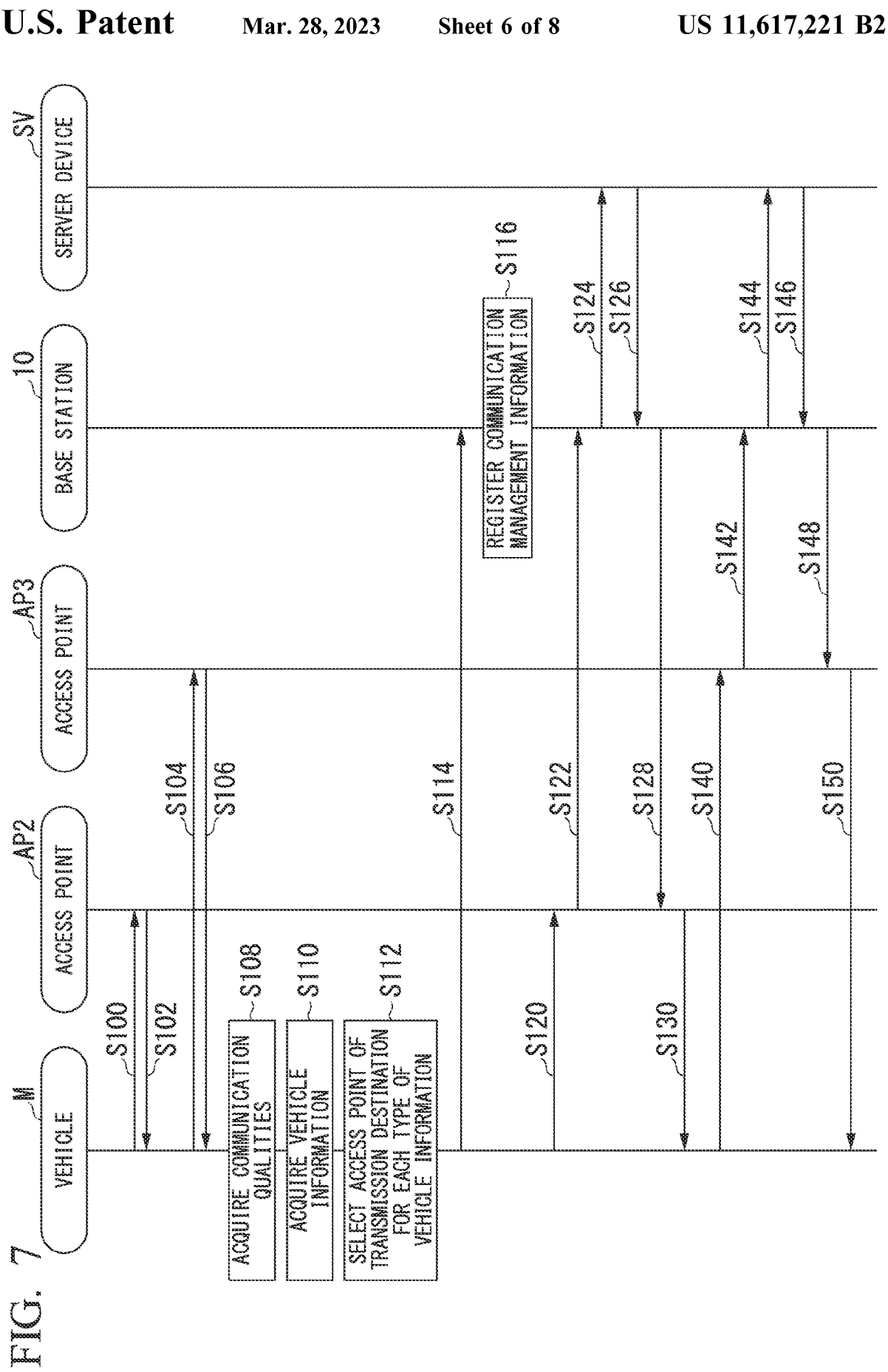
FIG. 7 is a sequence diagram showing an example of a process executed by the communication system according to the first embodiment.

FIG. 7 is a sequence diagram showing an example of a process executed by the communication system 1 according to the first embodiment. A flow of a process of mainly selecting the access point of the communication destination for transmission for each piece of vehicle information using the vehicle M (the communication device 100), the access points AP2 and AP3, and the base station 10 will be mainly described below. The process shown in FIG. 7 may be iteratively performed at predetermined timings or intervals. Hereinafter, it is assumed that the vehicle M is located within the communication ranges A2-2 and A2-3 of the access points AP2 and AP3.

In the example of FIG. 7, the vehicle M transmits a request signal to the access point AP2 (step S100) and receives a response signal for the request signal (step S102). The vehicle M transmits a request signal to the access point AP3 (step S104) and receives a response signal for the request signal (step S106). Next, the vehicle M acquires a delay time period from the transmission of the request signal to the reception of the response signal as the communication quality with respect to each of the access points AP2 and AP3 (step S108).

Next, the vehicle M acquires vehicle information from the in-vehicle device 200 or the like (step S110) and selects the access point of the transmission destination on the basis of the communication quality and communication requirement 262 for each access point for each type of acquired vehicle information (step S112). Next, the vehicle M transmits instruction information including a connection request for connecting to the selected access point to the base station 10 (step S114). Thereby, the server device SV can perform control for causing the access points AP2 and AP3 to execute communication with the vehicle M and can manage the communication state of each access point. The vehicle M may perform control for directly communicating with and connecting to the access points AP2 and AP3 instead of the processing of step S114. The base station 10 registers the communication management information 52 on the basis of a connected state (step S116).

Next, the vehicle M transmits the corresponding vehicle information for each selected access point. For example, when the vehicle information has been transmitted from the vehicle M to the access point AP2 (step S120), the access point AP2 transmits the received vehicle information to the base station 10 (step S122). The base station 10 receives the vehicle information transmitted from the access point AP2 and outputs the received vehicle information to the server device SV (step S124). The server device SV receives the vehicle information transmitted from the base station 10, stores the received vehicle information in the storage, performs various types of processes on the vehicle information, and transmits provision information to the base station 10 when there is information to be provided to the vehicle M (for example, driving control information) (step S126). The base station 10 receives the information transmitted from the server device SV and transmits the received information to the access point AP2 (step S128). The access point AP2 receives the information transmitted from the base station 10 and transmits the received information to the vehicle M (step S130).

When the vehicle information has been transmitted from the vehicle M to the access point AP3 (step S140), the access point AP3 transmits the received vehicle information to the base station 10 (step S142). The base station 10 receives the vehicle information transmitted from the access point AP3 and outputs the received vehicle information to the server device SV (step S144). The server device SV receives the vehicle information transmitted from the base station 10, stores the received vehicle information in the storage, performs various types of processes on the vehicle information, and transmits information to the base station 10 when there is information to be provided to the vehicle M (step S146). The base station 10 receives the information transmitted from the server device SV and transmits the received information to the access point AP3 (step S148). The access point AP3 receives the information transmitted from the base station 10 and transmits the received information to the vehicle M (step S150). Thereby, the vehicle M can acquire information from the server device SV and perform driving control and the like.

According to the above-described first embodiment, the vehicle M can efficiently transmit information having a high priority by measuring communication qualities associated with a plurality of access points AP and selecting an access point for transmitting vehicle information for each type of vehicle information to be transmitted from the vehicle M on the basis of the measured communication qualities. According to the first embodiment, it is possible to secure a communication band by performing communication using a plurality of access points according to the type of vehicle information and efficiently transmit much information.

The wireless communication scheme enables high-speed communication as the generation is new. However, even if the generation is new, the latency may increase due to an influence of the communication load, other communication environments, and the like. In the first embodiment, by selecting the access point of the transmission destination using the latency as the information about the communication quality, the vehicle information can be transmitted more efficiently regardless of the wireless communication scheme. According to the first embodiment, even if a new access point is added, the transmission destination of the vehicle information can be appropriately reselected in accordance with the latency. In the first embodiment, the access point AP may be a Wi-Fi router.

Second Embodiment

Next, a second embodiment of a communication system will be described. The communication system of the second embodiment is different from the communication system 1 of the first embodiment in that, in a situation in which a vehicle M # is connected to a plurality of access points AP (for example, a state in which communication using an assigned channel is possible), control for releasing a connected state associated with at least one access point among the plurality of access points AP is performed when communication quality satisfies a predetermined condition. Therefore, the above-described difference will be mainly described below. Because configurations similar to those of the communication system 1, the base station 10, and the access point AP in the first embodiment can be applied as configurations of a communication system, a base station, and an access point in the second embodiment, the specific description here will be described. In the following description, components similar to those in the first embodiment are denoted by the same reference signs and description thereof will be omitted.

Figure 8:
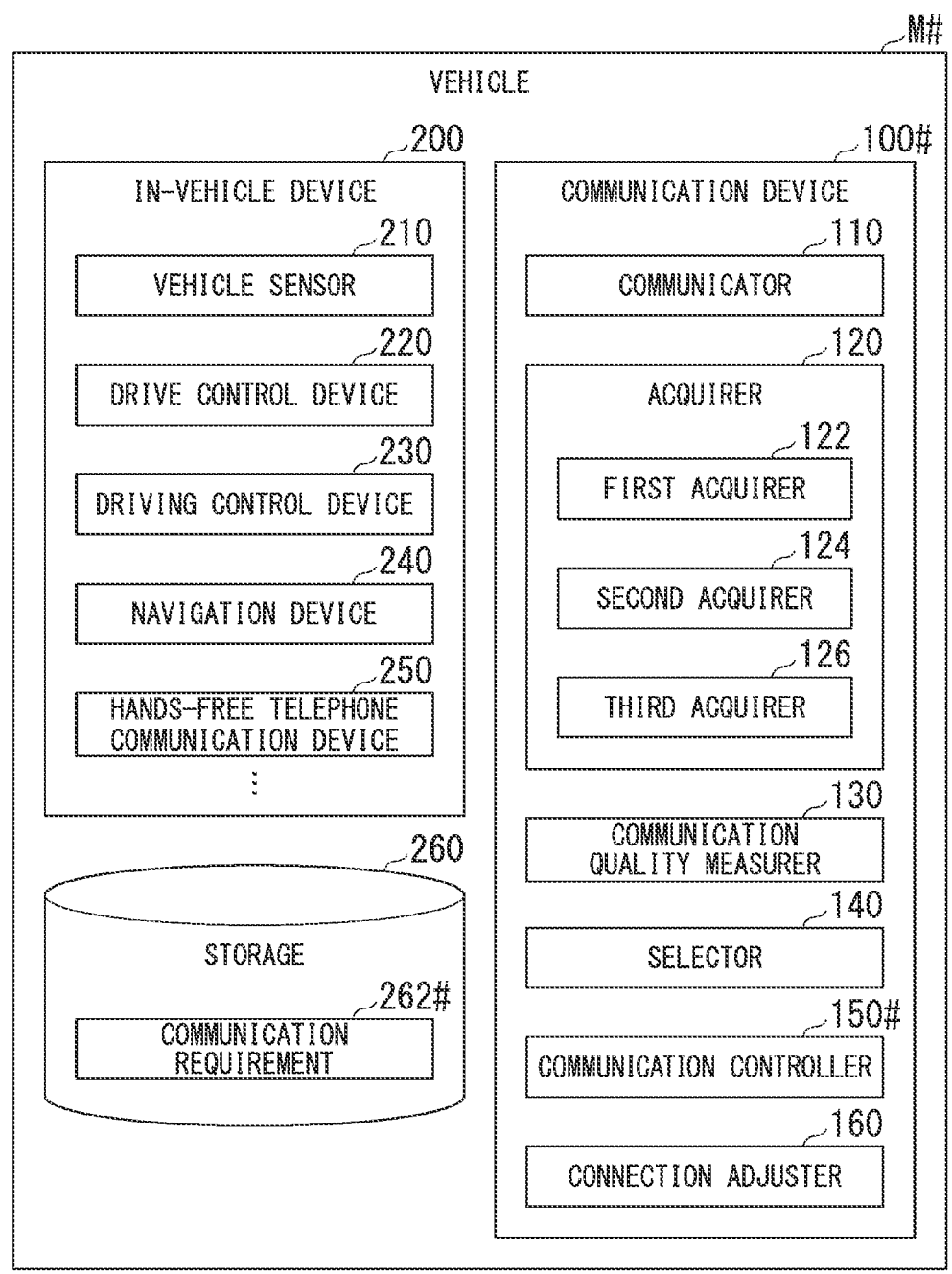
FIG. 8 is a configuration diagram of a vehicle including a communication device according to a second embodiment.

FIG. 8 is a configuration diagram of the vehicle M # including a communication device 100 # of the second embodiment. In the example of FIG. 8, the vehicle M # includes, for example, the communication device 100 #, an in-vehicle device 200, and a storage 260. The communication device 100 # includes a communicator 110, an acquirer 120, a communication quality measurer 130, a selector 140, a communication controller 150 #, and a connection adjuster 160. Each component of the communication device 100 # is implemented by, for example, a hardware processor such as a CPU executing a program (software). Some or all of these components may be implemented by hardware (including a circuit; circuitry) such as an LSI circuit, an ASIC, an FPGA, or a GPU or may be implemented by software and hardware in cooperation. The program may be pre-stored in the storage 260 or may be stored in a removable storage medium such as a DVD or a CD-ROM and installed in the storage 260 when the storage medium is mounted in a drive device. The communication device 100 # is different from the communication device 100 of the first embodiment in that the communication device 100 # includes a communication controller 150 # instead of the communication controller 150 and further includes the connection adjuster 160. Therefore, functions of the communication controller 150 # and the connection adjuster 160 will be mainly described below.

When the communicator 110 is connected to a plurality of access points, the connection adjuster 160 determines whether or not it is necessary to release a connected state associated with at least one access point among the plurality of access points on the basis of information about communication qualities acquired by the second acquirer 124. For example, the connection adjuster 160 determines that it is necessary to release the connected state associated with at least one access point when communication qualities of the plurality of access points connected to the communicator 110 satisfy a predetermined condition. The predetermined condition is, for example, a condition based on latency or reception strength.

For example, the connection adjuster 160 determines that it is necessary to release the connected state associated with at least one access point among the plurality of access points in the connected state when a delay time period of communication of the plurality of access points is greater than or equal to a predetermined time period. For example, the delay time period may be an average of delay time periods of the plurality of access points in the connected state or may be the longest delay time period among the delay time periods.

For example, when reception strength of a plurality of access points is less than or equal to a threshold value, the connection adjuster 160 may determine that it is necessary to release the connected state associated with at least one access point among the plurality of access points in the connected state. For example, the reception strength may be an average of reception strengths of the plurality of access points in the connected state or may be the lowest reception strength among the reception strengths.

The connection adjuster 160 may determine that it is necessary to release the connected state associated with at least one of the plurality of access points in the connected state when a communication speed of the plurality of access points is lower than or equal to a predetermined speed. The communication speed may be, for example, an average of communication speeds of the plurality of access points in the connected state or may be the lowest communication speed among the communication speeds. The communication speed may be a value estimated on the basis of the wireless communication scheme set in each access point.

The connection adjuster 160 may determine that it is necessary to release the connected state associated with at least one access point among the plurality of access points in the connected state when there are a plurality of types of wireless communication schemes included in the communication quality. For example, the connection adjuster 160 determines that it is necessary to release the connected state associated with at least one access point when there are an access point that performs communication based on 4G and an access point that performs communication based on 5G among a plurality of access points connected to the communicator 110.

The connection adjuster 160 determines an access point whose connected state is released on the basis of the communication quality of each access point when it is determined that it is necessary to release the connected state associated with at least one access point among the plurality of access points connected to the communicator 110. For example, the connection adjuster 160 compares the delay time periods of the access points and determines the access point having the longest delay time period or a delay time period greater than or equal to a predetermined time period as the access point whose connected state is released. The connection adjuster 160 may compare the reception strengths of the access points and determine an access point having the lowest reception strength or an access point having reception strength less than a threshold value as the access point whose connected state is released. The connection adjuster 160 may compare the communication speeds of the access points and determine an access point having the lowest communication speed or an access point having a communication speed less than a predetermined speed as the access point whose connected state is released.

Even if the connection adjuster 160 may determine an access point whose connected state is released in accordance with a type of wireless communication scheme when there are a plurality of types of communication schemes for each of the plurality of access points connected to the communicator 110. In this case, for example, when the types of wireless communication schemes are 3G and 4G, the connection adjuster 160 determines an access point connected in a 3G (older-generation) communication scheme in which the communication speed on the standard is low as the access point whose connected state is released. When the types of wireless communication schemes are 4G and 5G, the connection adjuster 160 determines an access point connected in a 4G (older-generation) communication scheme in which the communication speed on the standard is low as the access point whose connected state is released. Thereby, when the connection with an access point of low-speed communication is established even though the connection with the access point of high-speed communication is established, it is possible to reduce the latency and more efficiently transmit and receive data by releasing the connected state associated with a low-speed side access point even if latency is suitable for low-speed communication.

The connection adjuster 160 may determine an access point whose connected state is released on the basis of communication requirement 262 for each piece of vehicle information acquired by the third acquirer 126. For example, in the example of the communication requirement 262 of FIG. 6, an access point corresponding to a delay time period associated with a type of vehicle information having a low priority (for example, non-driving information) among the types of vehicle information associated with priorities 1 to 4 is determined to be the access point whose connected state is released. In the example of FIG. 6, it is possible to preferentially transmit automated driving-related data, drive control data, surrounding information, and the like having a high priority by releasing the connected state associated with an access point having a delay time period greater than or equal to 100 [ms] and restricting transmission of non-driving information and the like.

In addition to a function similar to that of the communication controller 150 of the first embodiment, the communication controller 150 # generates a connection release request for requesting the release of the connected state associated with a determined access point when the connection adjuster 160 determines the access point whose connected state is released and generates instruction information including the generated connection release request. For example, the connection release request includes identification information of the vehicle M # or the communication device 100 # and identification information of the access point AP whose connected state is released. The communication controller 150 # transmits the generated instruction information to the base station 10. In this case, for example, the communication controller 150 # includes the instruction information in an RRC message of a C-plane signal and transmits the RRC message to the base station 10. Thereby, the release request can be transmitted to the base station 10 using the existing signal.

In the second embodiment, the base station 10 receives the instruction information in addition to the reception of the vehicle information from the vehicle M # in the first communicator 22. In addition to the execution of a process similar to that of the first embodiment, the information processor 40 of the second embodiment transmits control information for releasing a connection with the vehicle included in the connection release request to a designated access point via the second communicator 24 on the basis of the connection release request included in the instruction information received by the first communicator 22. When information indicating that the connected state has been released has been acquired from the designated access point, the information processor 40 may update communication management information 52 or transmit information indicating that the release of the connected state has been executed (information indicating normal completion) to the vehicle M #.

When response information for the connection release request (for example, information indicating that the connection release request has been made) has been transmitted from the base station 10, the connection adjuster 160 may acquire information about communication qualities associated with a plurality of access points in a currently connected state again and determine whether or not it is necessary to release the connected state associated with at least one access point among the plurality of access points in the connected state associated with the communicator 110 on the basis of the acquired information about the communication qualities. Thereby, vehicle information can be transmitted in a more appropriate communication environment.

[Processing Sequence]

Figure 9:
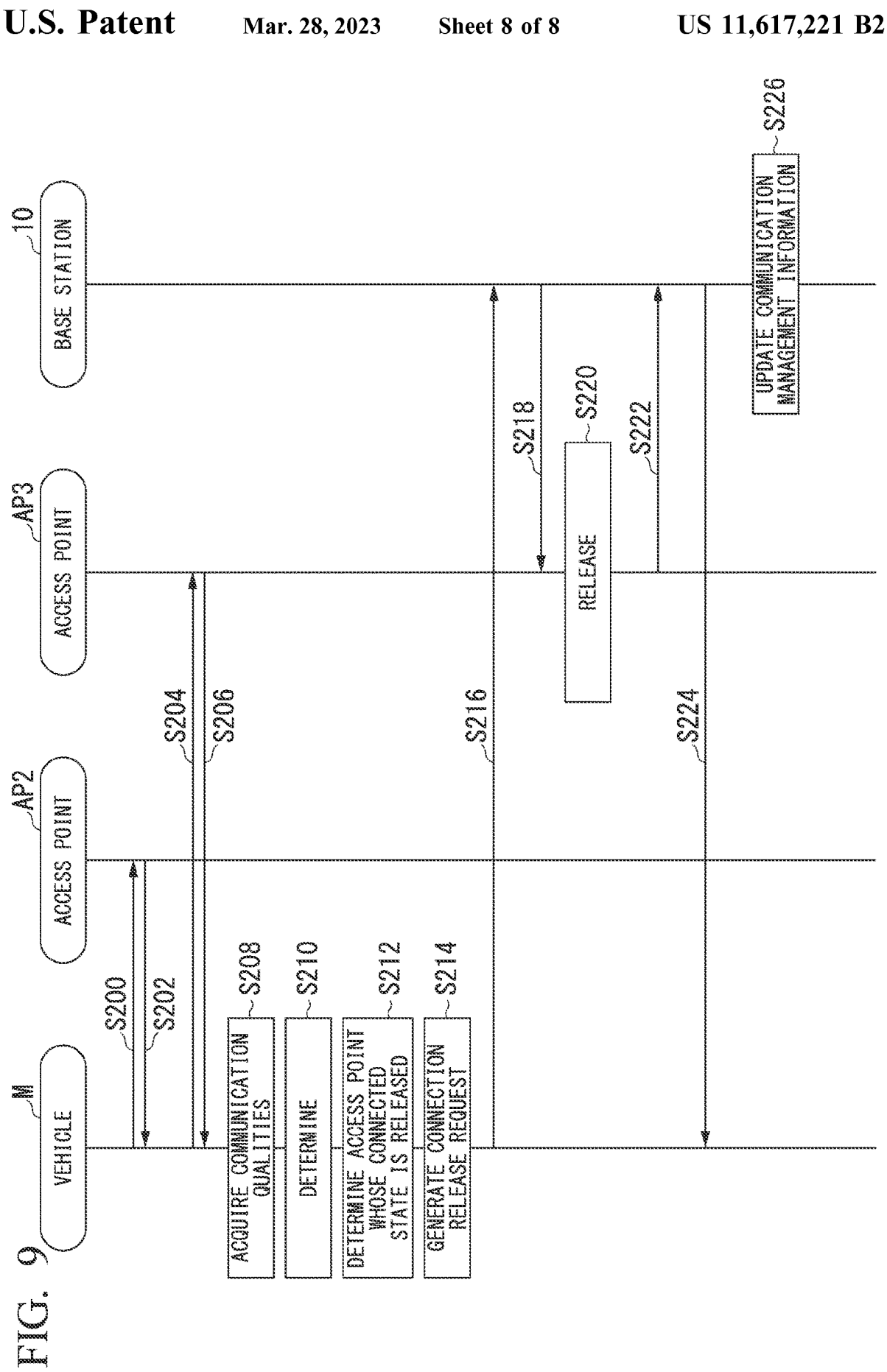
FIG. 9 is a sequence diagram showing an example of a process executed by a communication system according to the second embodiment.

FIG. 9 is a sequence diagram showing an example of a process executed by the communication system according to the second embodiment. A flow of a process of mainly releasing the connection with the access point using the vehicle M #, the access points AP2 and AP3, and the base station 10 will be mainly described below. In the example of FIG. 8, it is assumed that the vehicle M # is connected to the base station 10 and the access points AP2 and AP3.

In the example of FIG. 9, the vehicle M # transmits a request signal to the access point AP2 (step S200) and receives a response signal for the request signal (step S202). The vehicle M # transmits a request signal to the access point AP3 (step S204) and receives a response signal for the request signal (step S206). Next, the vehicle M # acquires a delay time period from the transmission of the request signal to the reception of the response signal as the communication quality with respect to each of the access points AP2 and AP3 (step S208). At the start of the process of FIG. 9, the vehicle M # and the access points AP2 and AP3 are already connected. Thus, in the processing of step S208, instead of the process using the request signal and the response signal described above, communication qualities may be acquired on the basis of data transmitted and received between the vehicle M # and the access points AP2 and AP3.

Next, the vehicle M # performs a determination process of determining whether or not it is necessary to release the connected state between the vehicle M # and at least one of the access points AP2 and AP3 on the basis of the acquired communication qualities (step S210). When it is determined that it is necessary to release the connected state associated with at least one access point, the vehicle M # determines an access point whose connected state is released (step S212). In the example of FIG. 9, it is assumed that the access point AP3 is determined as the access point whose connected state is released.

Next, the vehicle M # generates a connection release request for releasing the connected state associated with the determined access point AP3 (step S214) and transmits instruction information including the generated connection release request to the base station 10 (step S216).

The base station 10 receives the instruction information transmitted from the vehicle M # and transmits control information for releasing the connected state between the vehicle M # and the access point AP3 to the access point AP3 on the basis of the received instruction information (step S218). The access point AP3 receives the instruction information from the base station 10 and releases the connected state associated with the vehicle M # on the basis of the received instruction information (step S220). When the access point AP3 transmits or receives data to or from the vehicle M # at a timing when the instruction information for releasing the connected state has been received, the access point AP3 performs control for releasing the connected state after the transmission or reception of data is completed. The access point AP3 transmits information indicating that the connected state associated with the vehicle M # indicated by the instruction has been released to the base station 10 (step S222).

The base station 10 transmits information indicating that the connected state of the access point AP3 for which the connection release request has been made has been released to the vehicle M # (step S224) and updates the communication management information 52 (step S226). The vehicle M # receives the information indicating that the connected state of the access point AP3 for which the connection release request has been made has been released and performs transmission and reception of data via the access point AP2 whose connected state has not been released or the base station 10. When the information indicating that the communication connected state has been released has been received from the base station 10 according to the processing of step S224, the vehicle M # may perform the process from step S200 again and further determine whether or not it is necessary to release a connected state associated with at least one access point among the access points in the connected state.

When it is determined that it is not necessary to release the connected state associated with at least one access point in the processing of step S210, the vehicle M # performs the transmission and reception of vehicle information using the access point AP2 or AP3 in the connected state or the base station 10 without performing the processing of steps S210 to S226.

According to the above-described second embodiment, it is possible to improve communication quality by releasing a connected state associated with at least one access point among a plurality of access points on the basis of communication qualities in a state in which connections with the plurality of access points are established. Thereby, more efficient data transmission and reception can be implemented. According to the second embodiment, it is possible to release a connected stat associated with an access point using the existing technology by transmitting a request for releasing the connected state associated with the access point to the base station 10 using an RRC message.

For example, when resource blocks are shared between communication schemes under a situation in which the vehicle M # is connected to one or more access points for performing 4G communication and one or more access points for performing 5G communication, there is a possibility that latency will increase in accordance with 4G. Therefore, in the second embodiment, it is possible to perform transmission and reception of data more efficiently by releasing a connected state associated with an access point having a low communication speed (for example, an old-generation communication scheme) according to a standard on the basis of a communication scheme and decreasing latency.

Modified Examples

Each of the above-described first and second embodiments may be combined with a part or all of the other embodiment. In the communication systems shown in the first embodiment and the second embodiment, the communication devices 100 and 100 # may be portable communication terminals capable of communicating with in-vehicle equipment instead of (or in addition to) a communication device mounted in a vehicle. The portable communication terminal is, for example, a smartphone or a tablet terminal. For example, the portable communication terminal is removably mounted in the vehicles M and M # or performs communication with the in-vehicle device 200 in a wired or wireless manner, acquires vehicle information, and transmits the vehicle information to the access point AP or the base station 10.

In the communication system 1 of the embodiment, the access points AP1 to AP3 may be connected to another base station as well as the base station 10. In this case, the communication system 1 can transmit and receive data through a plurality of base stations according to a dual connectivity (DC) function in which the plurality of base stations manage access points.

In the above-described embodiments, the access point AP may also be referred to as, for example, a base station, a wireless router, an S-cell communication device, or the like and the base station 10 may also be referred to as an access point, a wireless router, a P-cell communication device, or the like.

The above-described embodiment can be implemented as follows.

A communication device including:
a storage device storing a program; and
a hardware processor,
wherein the hardware processor executes the program stored in the storage device to:
perform communication with a base station and a plurality of access points having narrower communication ranges than the base station;
acquire vehicle information from in-vehicle equipment;
acquire information about communication quality for each of the plurality of access points; and
release a connected state associated with a determined access point when the access point whose connected state is released is determined on the basis of the information about the communication quality if communication with the plurality of access points is in the connected state.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication device comprising:
a processor that executes instructions to:
perform communication with a base station and a plurality of access points having narrower communication ranges than the base station;
acquire vehicle information from in-vehicle equipment;
acquire information about communication quality for each of the plurality of access points; and
release a connected state associated with a determined access point when the access point whose connected state is released is determined on the basis of the information about the communication quality acquired when communication with the plurality of access points is in the connected state.

2. The communication device according to claim 1,
wherein each of the plurality of access points is connected to the base station and
wherein the processor generates a connection release request for releasing the connected state associated with the access point when the access point whose connected state is released is determined and causes the generated connection release request to be transmitted to the base station.

3. The communication device according to claim 1, wherein the processor further executes instructions to:
acquire a communication requirement for each piece of the vehicle information, and
determine the access point whose connected state is released on the basis of the communication requirement.

4. The communication device according to claim 1, wherein the processor further executes instructions to determine the access point whose connected state is released among a plurality of access points in the connected state on the basis of delay information of communication with the access point included in the communication quality.

5. The communication device according to claim 1, wherein the processor further executes instructions to determine an access point for performing communication in a predetermined communication scheme as the access point whose connected state is released when the plurality of access points perform communication with the communication device in different communication schemes.

6. A base station comprising:
a processor that executes instructions to:
perform a first wireless communication with a vehicle located within a first communication range;
perform communication with a plurality of access points that perform a second wireless communication with the vehicle in a second communication range narrower than the first communication range; and
perform a predetermined process on the basis of information received in the first wireless communication and in the second wireless communication,
wherein, when a connection release request for releasing a connected state associated with at least one access point among a plurality of access points connected to the vehicle has been received in the first communication, the processor causes the connected state between the access point associated with the connection release request and the vehicle to be released via the second wireless communication.

7. A communication system including a base station and a communication device mounted in a vehicle,
wherein the communication device comprising:
a first processor that executes instructions to:
perform communication with a base station and a plurality of access points having narrower communication ranges than the base station;

acquire vehicle information from in-vehicle equipment;
acquire information about communication quality for each of the plurality of access points; and
release a connected state associated with a determined access point when the access point whose connected state is released is determined on the basis of the information about the communication quality acquired when communication with the plurality of access points is in the connected state,
wherein the base station comprising:
a second processor that executes instructions to:
perform a first wireless communication with the vehicle located within a first communication range;
perform communication with a plurality of access points that perform second wireless communication with the vehicle in a second communication range narrower than the first communication range; and
perform a predetermined process on the basis of information received in the first wireless communication and in the second wireless communication, and
wherein, when a connection release request for releasing a connected state associated with at least one access point among a plurality of access points connected to the vehicle has been received in the first communication, the second processor causes the connected state between the access point associated with the connection release request and the vehicle to be released via the second wireless communication.

\* \* \* \* \*